United States Patent [19]
Crysler et al.

[11] Patent Number: 5,346,443
[45] Date of Patent: Sep. 13, 1994

[54] PARALLEL-AXIS GEAR DIFFERENTIAL WITH LIMITED EDGE CONTACT BETWEEN GEAR MEMBERS

[75] Inventors: Daniel E. Crysler, Spencerport; Steven E. Ostertag, Rochester, both of N.Y.

[73] Assignee: Zexel-Gleason USA, Inc., Rochester, N.Y.

[21] Appl. No.: 21,351

[22] Filed: Feb. 23, 1993

[51] Int. Cl.⁵ .............................. F16H 1/42
[52] U.S. Cl. ......................... 475/252; 475/248
[58] Field of Search ..................... 475/248, 252

[56] References Cited

U.S. PATENT DOCUMENTS

| | | | |
|---|---|---|---|
| 3,060,765 | 10/1962 | Rinsoz | 475/248 |
| 3,768,336 | 10/1973 | Wharton | 475/252 |
| 5,122,101 | 6/1992 | Tseng . | |
| 5,122,101 | 6/1992 | Tseng | 475/252 |
| 5,147,252 | 9/1992 | Mace et al. | 475/252 |
| 5,169,370 | 12/1992 | Dye et al. . | |
| 5,232,417 | 8/1993 | Amborn et al. | 475/257 |
| 5,244,440 | 9/1993 | Ichiki | 475/220 |
| 5,292,291 | 3/1994 | Ostertag | 475/252 |
| 5,295,923 | 3/1994 | Takefuta | 475/252 |

FOREIGN PATENT DOCUMENTS

| | | | |
|---|---|---|---|
| 811650 | 8/1951 | Fed. Rep. of Germany | 475/252 |
| 4126866 | 2/1993 | Fed. Rep. of Germany | 475/248 |
| 323933 | 1/1930 | United Kingdom | 475/252 |

OTHER PUBLICATIONS

"Deburring and Tooth–edge Round-over Tolerances" from *Gear Handbook*, Darle W. Dudley (Ed.), McGraw-Hill, 1962.

*Primary Examiner*—Thomas E. Denion
*Attorney, Agent, or Firm*—Eugene Stephens & Associates

[57] ABSTRACT

A parallel-axis gear differential has pairs of top and bottom planet gears (38 and 40, 42 and 44, and 46 and 48) operatively connecting a pair of side gears (30 and 32). Each of the planet gears has a main gear section (74, 80) and a transfer gear section (76, 82) interconnected by a stem section (78, 84). Teeth (86 and 88) of the side gears (30 and 32) are separated through a clearance space (100) formed by a hub (98) of side gear (32). Within the clearance space (100), teeth (90 and 94) of the main planet gear sections (74 and 80) overlap the side gear teeth (86 and 88). Inner and outer ends (102 and 104) of the side gear teeth (86 and 88) are inclined at a chamfer angle (A) throughout a distance that extends between top and bottom lands (106 and 108) of the side gears.

9 Claims, 5 Drawing Sheets

PARALLEL-AXIS GEAR DIFFERENTIAL WITH LIMITED EDGE CONTACT BETWEEN GEAR MEMBERS

FIELD OF INVENTION

The invention relates to automotive differentials having planetary gear arrangements mounted within a housing for dividing engine power between two output shafts.

BACKGROUND

Gear differentials include a compound planetary gear set mounted within a differential housing. The planetary gear set interconnects a pair of output shafts for opposite directions of rotation with respect to the housing. The housing is rotatable by engine power about a common axis of rotation shared by the output shafts.

Ordinarily, the planetary gear set is arranged to permit the output shafts to rotate by equal amounts but in opposite directions with respect to the housing. Accordingly, the housing rotates about the common axis of the output shafts at the average speed of the two output shafts. Drive torque is distributed between the two relatively rotating output shafts in accordance with the efficiency of the planetary gear set.

Sun gear members of the planetary gear set, also referred to as "side gears", are coupled to inner ends of the output shafts. Planet gear members of the same set operatively connect the two side gears for rotation in opposite directions. Sometimes, the sun gear members and the planet gear members of the same set are mounted within the differential housing for rotation about parallel axis. Gear differentials with this type of gearing arrangement are referred to as "parallel-axis" gear differentials.

The planet gears of parallel-axis gear differentials are generally mounted in pairs within the housing. One portion of each planet gear meshes with one of the side gears, and another portion of each planet gear meshes with its paired planet gear. However, the planet gears are individually supported for rotation on shafts or within cylindrical pockets formed in the housing.

A commonly assigned U.S. Pat. No. 5,122,101 discloses an example of a parallel-axis gear differential in which the planet gears have main and transfer gear sections separated by a stem. The main gear section of a first planet gear member of a pair meshes with one of the side gears and with the transfer gear section of the second planet gear member of the pair. The main gear section of the second planet gear member meshes with the other side gear and with the transfer gear section of the first planet gear member. The two meshes between the paired planet gears straddle the two meshes between the planet and side gears.

Although the straddled planet gear meshes reduce tipping of the planet gears within their pockets, some misalignment between the gear meshes is still possible because of normal tolerancing and housing distortions under load. The misalignments can move contact between mating gear teeth to ends of the teeth. Higher load concentrations at the tooth ends can cause gear failures by pitting, scoring, or breakage. Tooth ends of misaligned gear members in contact with their end mounting surfaces can also cause significant housing wear.

The planet and side gear blanks are often made with small chamfers that bevel tooth tips at opposite ends of the gears. The chamfers, which are typically inclined at forty-five degrees from the gear ends, extend from the tooth tips to approximately the pitch line of the teeth. Although the known chamfers reduce wear between the gear ends and their mounting surfaces, the chamfers do not prevent edge contact between mating teeth. In fact, the known chamfers produce an angled tooth edge that is subject to chipping from edge contact. Any such chipping is considered a major failure because the chips can cause more significant damage elsewhere in the differential.

SUMMARY OF INVENTION

Our invention improves parallel-axis gear differentials having straddled planet gear meshes by better accommodating slight misalignments of the gears. Tooth end chipping is reduced by avoiding edge contact between mating gears.

One example of the invention is a parallel-axis gear differential having a housing that is rotatable about a pair of output shafts. A pair of side gears mounted within the housing is arranged to receive ends of the output shafts for rotation about a common axis. Pairs of planet gears are mounted within pockets of the housing for rotation about respective axes that are parallel to the common axis of the side gears.

Each of the planet gears includes a main gear section and a transfer gear section interconnected by a stem section. The main gear section of a first planet gear of a pair meshes with one of the side gears and with the transfer gear section of a second planet gear of the pair. Similarly, the main gear section of the second planet gear meshes with the other side gear and with the transfer gear section of the first planet gear.

The two side gears have respective teeth that are separated by a clearance space along the common axis. Within this clearance space, teeth of the main gear sections of the first and second planet gears overlap the teeth of their mating side gears. The overlap between the main gear sections of the planet gears and the side gears avoids tooth edge contact between the mating gear teeth.

Similarly, a clearance space can be formed between the main gear sections of the first and second planet gears in a direction of the common axis. Within the clearance space between the main gear sections, the teeth of the two side gears can be arranged to overlap the mating teeth of the main gear sections. The amount of overlap is sufficient to accommodate misalignments of the planet and side gears by avoiding tooth edge contact between the mating gears.

Each of the planet and side gears is further defined by respective axial planes containing their axes and by respective transverse planes that extend normal to their axes. The gear sections of each planet gear and the side gears have teeth that are bound in respective axial planes by inner and outer tooth ends and are bound in respective transverse planes by top and bottom lands. The tooth ends are preferably inclined with respect to the respective transverse planes throughout distances that extend between the top and bottom lands of the gear teeth. The extended inclines form chamfers that are less susceptible to chipping and better accommodate deburring operations on tooth edges.

The outer ends of the main and transfer gear sections are formed in the outer ends of the planet gears. Preferably, the outer ends of the first planet gear are inclined by an angle different from the outer ends of the second planet gear. The difference in incline is sufficient to accommodate ordinary misalignments by avoiding edge contact between mating planet gear teeth.

DRAWINGS

DETAILED DESCRIPTION

Figure 1:
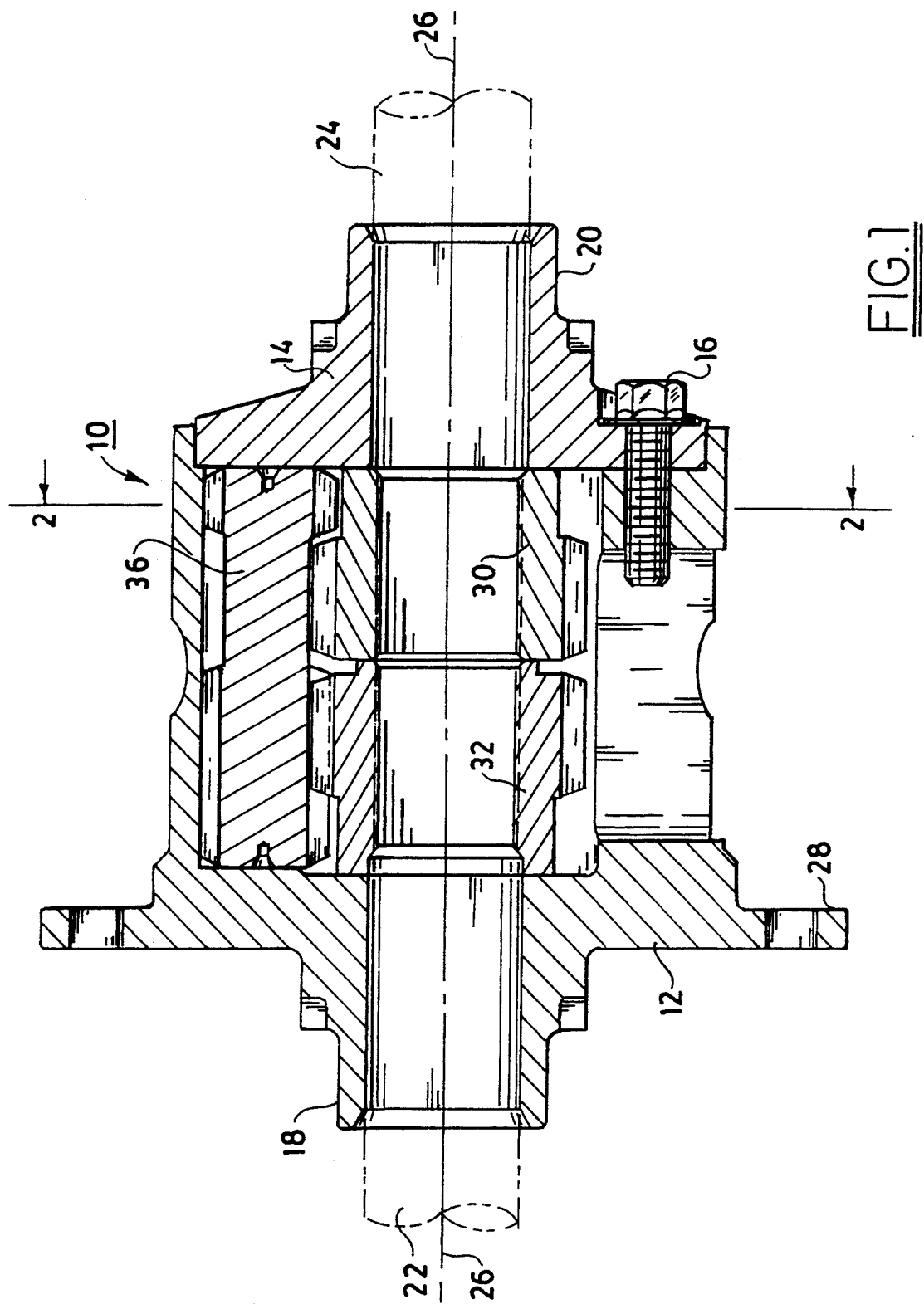
FIG. 1 is an axial sectional view of a modified parallel-axis gear differential taken along an axis of rotation of the differential.

One example of our invention is depicted in the first two drawing figures as an improvement over the parallel-axis gear differential disclosed in commonly assigned U.S. Pat. No. 5,122,101. The disclosure of this commonly assigned patent is hereby incorporated by reference.

The illustrated differential has a housing 10 that is assembled from a main body 12 and an end cap 14. Bolts 16 secure the end cap 14 to the main body 12. Respective trunnions 18 and 20, formed in the main body 12 and end cap 14, support the ends of two output shafts 22 and 24 for rotation about a common axis 26. A flange 28, formed in the main body 12, is adapted to receive a ring gear (not shown) for transmitting drive power to the housing 10.

Coupled to the ends of the output shafts 22 and 24 are top and bottom side gears 30 and 32, which function as sun gears within a planetary gear arrangement. By convention, the top side gear 30 is located adjacent to the end of housing 10 that includes the end cap 14, and the bottom side gear 32 is located adjacent to the end of housing 10 that includes the flange 28.

Three pairs of top and bottom planet gears 38 and 40, 42 and 44, and 46 and 48 form separate gear trains for rotating the top and bottom side gears 30 and 32 in opposite directions about the common axis 26. The top planet gears 38, 42, and 46 mesh with the top side gear 30; and the bottom planet gears 40, 44, and 48 mesh with the bottom side gear The individual planet gears 38, 40, 42, 44, 46, and 48 are mounted for rotation within respective pockets 50, 52, 54, 56, 58, and 60 that form bearing surfaces within the housing 10 for supporting outside cylinder surfaces of the planet gears. The pockets 50, 52, 54, 56, 58, and 60 are positioned within the housing for supporting rotations of the planet gears 38 and 40, 42 and 44, and 46 and 48 about respective axes 62, 64, 66, 68, 70, and 72 that extend parallel to the common axis 26.

Figure 3:
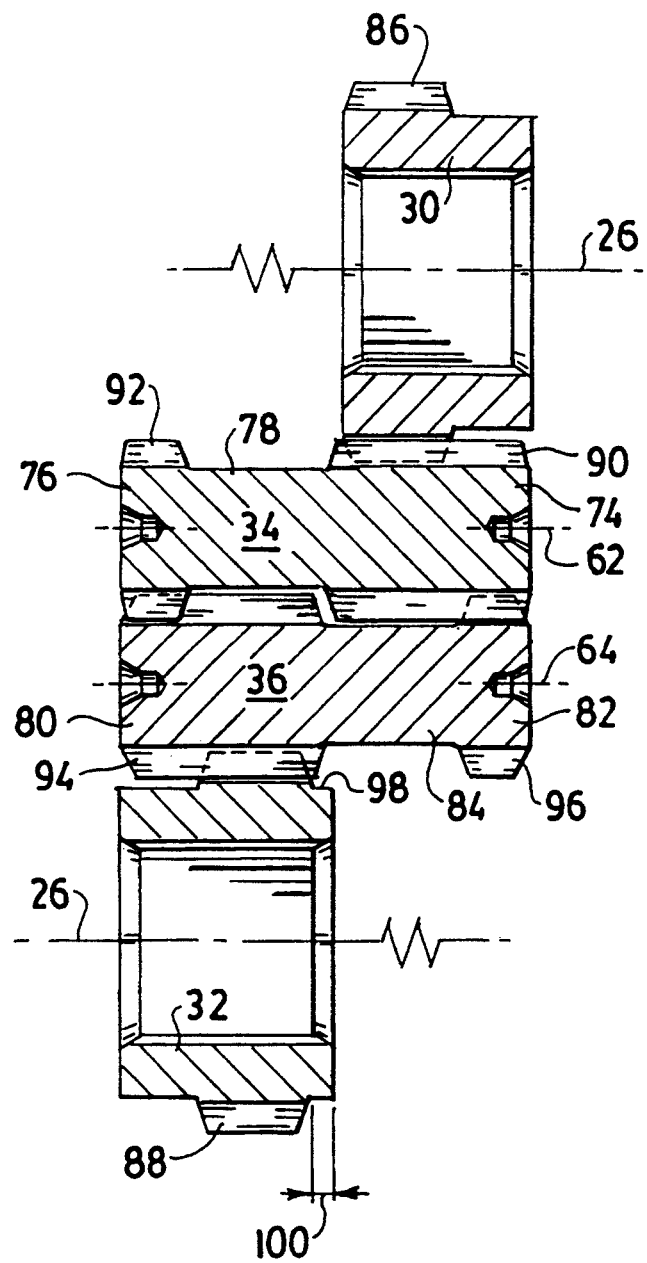
FIG. 3 is a diagram showing part of a gear arrangement within the parallel-axis differential in which the gear members of the arrangement are pivoted out of their normal running positions into a single axial plane.

The meshing relationships of one gear train, comprising top and bottom planet gears 34 and 36 inter-connecting top and bottom side gears 30 and 32, are illustrated by FIG. 3. For purposes of simplification, the gear train has been unwrapped to position all of the gear axes 26, 62, and 64 in the same plane, the common axis 26 being split as indicated. Although not illustrated in FIG. 3, the two other pairs of planet gears 42, 44 and 46, 48 form similar gear trains interconnecting the side gears 30 and 32.

The top planet gear 34 includes main gear section 74 and transfer gear section 76 interconnected by stem section 78. Similarly, the bottom planet gear 36 includes main gear section 80 and transfer gear section 82 interconnected by stem section 84. The main gear section 74 of the top planet gear includes teeth 90 in mesh with teeth 86 in the top side gear 30 and with teeth 96 in the transfer gear section 82 of the bottom planet gear. The main gear section 80 of the bottom planet gear includes teeth 94 in mesh with teeth 88 in the bottom side gear 32 and with teeth 92 in the transfer gear section 76 of the top planet gear. The stem sections 78 and 84 provide clearance for the respective bottom and top side gears 32 and 30.

A hub 98 is formed in an inner end face of the bottom side gear 32 for separating the top and bottom side gear teeth 86 and 88 along the common axis 26 through a clearance space 100. The teeth 90 and 94 of the main gear sections of the top and bottom planet gears respectively overlap the teeth 86 and 88 of the top and bottom side gears within the clearance space. The amount of overlap is sufficient to accommodate ordinary misalignments between the side and planet gears by preventing tooth edge contact between their mating teeth 86, 90 and 88, 94.

Figure 2:
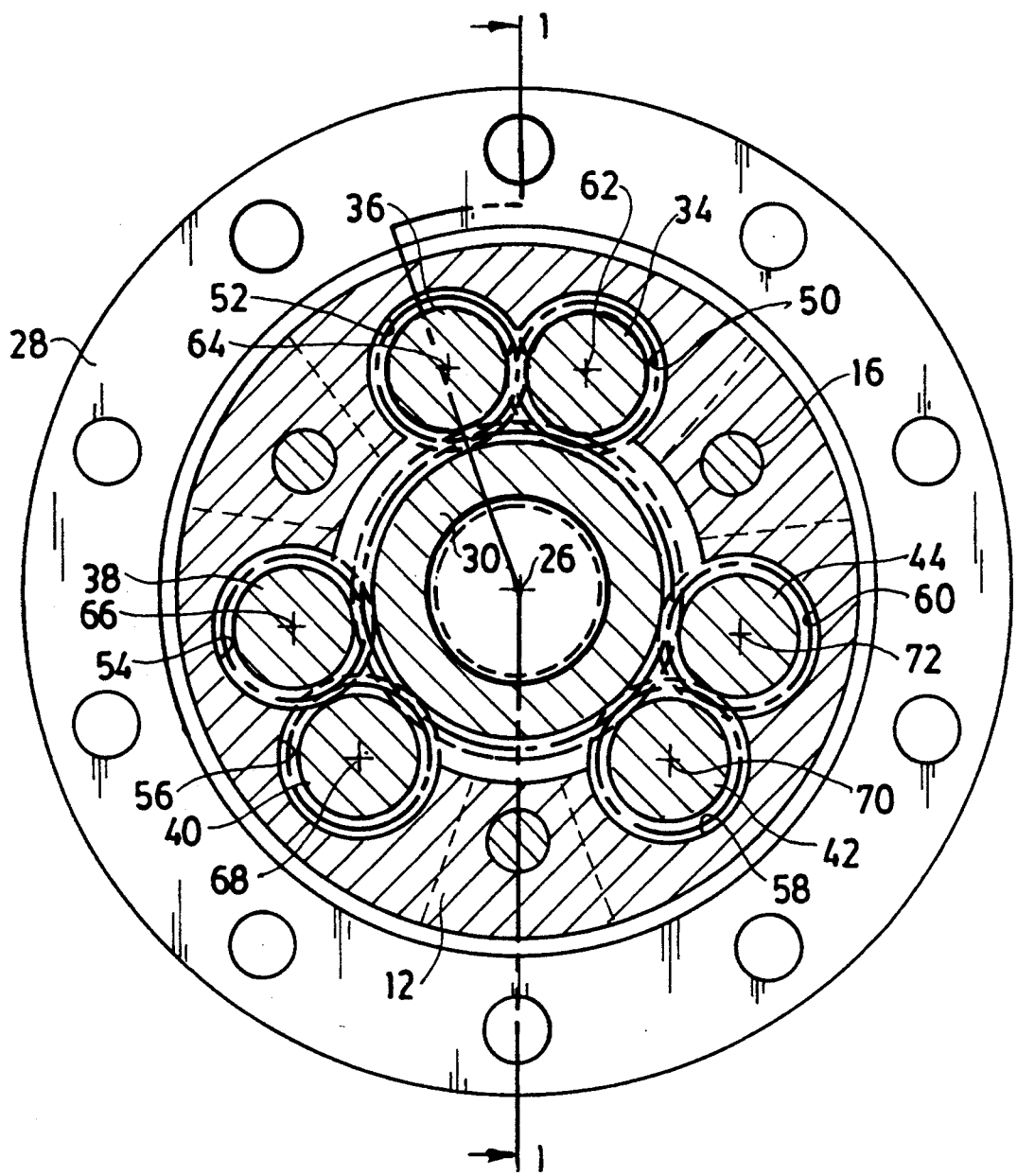
FIG. 2 is a transverse sectional view of the same differential taken along line 2—2 of FIG. 1.
Figure 4:
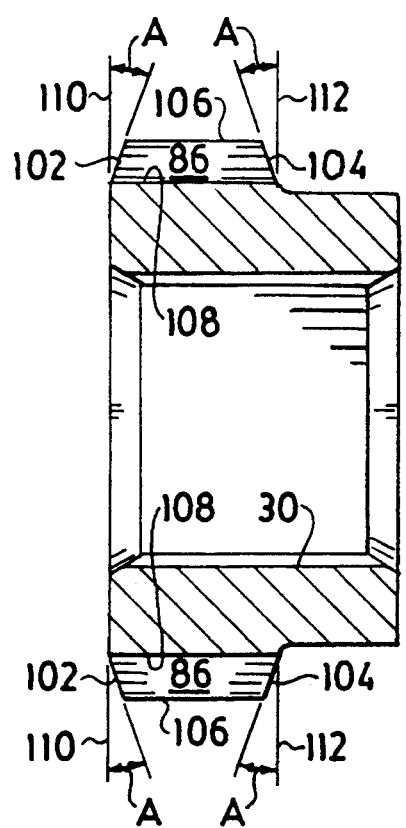
FIG. 4 is an enlarged axial section of a side gear member of the gear arrangement shown in FIG. 3.

In FIG. 4, the top side gear 30 is sectioned in the same axial plane as in FIG. 3 but is enlarged to show more details of the teeth 86. For example, the side gear teeth 86 are bound in an axial plane of the top side gear 30 (i.e., the plane of FIG. 4) by inner and outer ends 102 and 104 and are bound in a transverse plane of the top side gear (i.e., the plane of FIG. 2) by top and bottom lands 106 and 108.

Both the inner and outer ends 102 and 104 of the side gears are inclined with respect to transverse planes 110 and 112 through a chamfer angle "A". The incline extends throughout a distance between the top and bottom lands 106 and 108 of the teeth 86. The extended incline replaces the sharp corners of prior chamfers and better exposes tooth edges to deburring media to further reduce the possibility of chipping edges of the teeth. The preferred chamfer angle "A" is 20 degrees. However, chamfer angles of 30 degrees or less can be used without appreciably shortening the top lands 106 of the teeth over the prior effects of shorter chamfers at higher angles.

Figure 5:
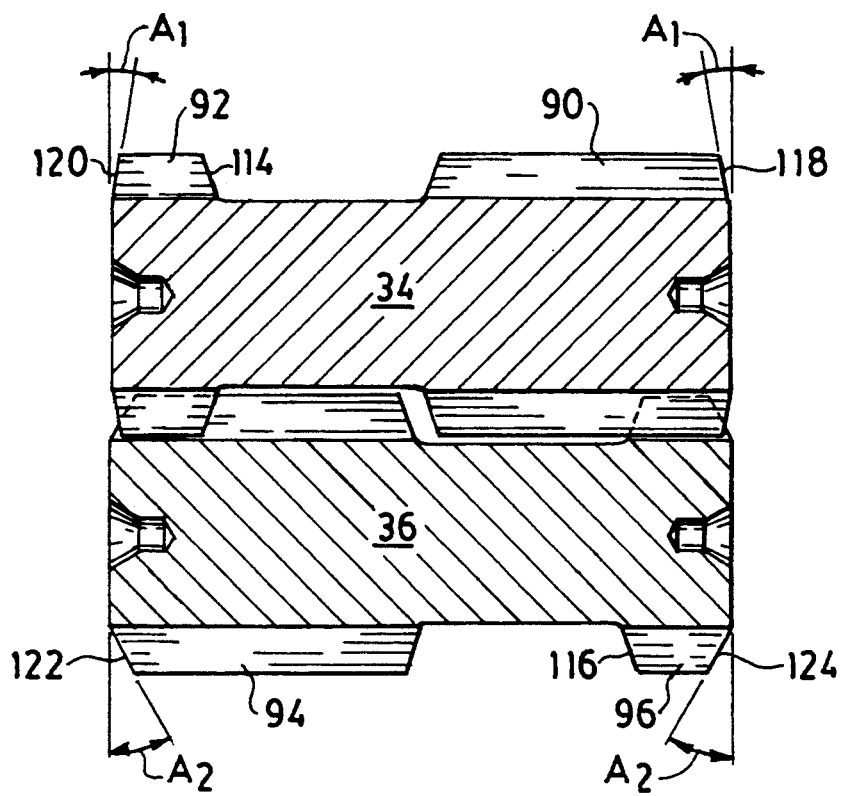
FIG. 5 is an enlarged axial section of two planet gear members of the gear arrangement shown in FIG. 4.

Referring to FIG. 5, similar chamfers are applied to inner ends 114 and 116 of the transfer section teeth 92 and 96 of the top and bottom planet gears. However, outer ends 118 and 120 of the main and transfer section teeth 90 and 92 of the top planet gear are preferably inclined by a different angle from outer ends 122 and 124 of the main and transfer section teeth 94 and 96 of the bottom planet gear. For example, the outer ends 118 and 120 of the top planet gear teeth are inclined through an angle "$A_1$" that is less than an angle "$A_2$" through which the outer ends 122 and 124 of the bottom planet gear teeth are inclined. The difference between the angles "$A_1$" and "$A_2$" is sufficient to prevent contact between the ends of the top and bottom planet gear teeth within the working profiles of the teeth.

Figure 6:
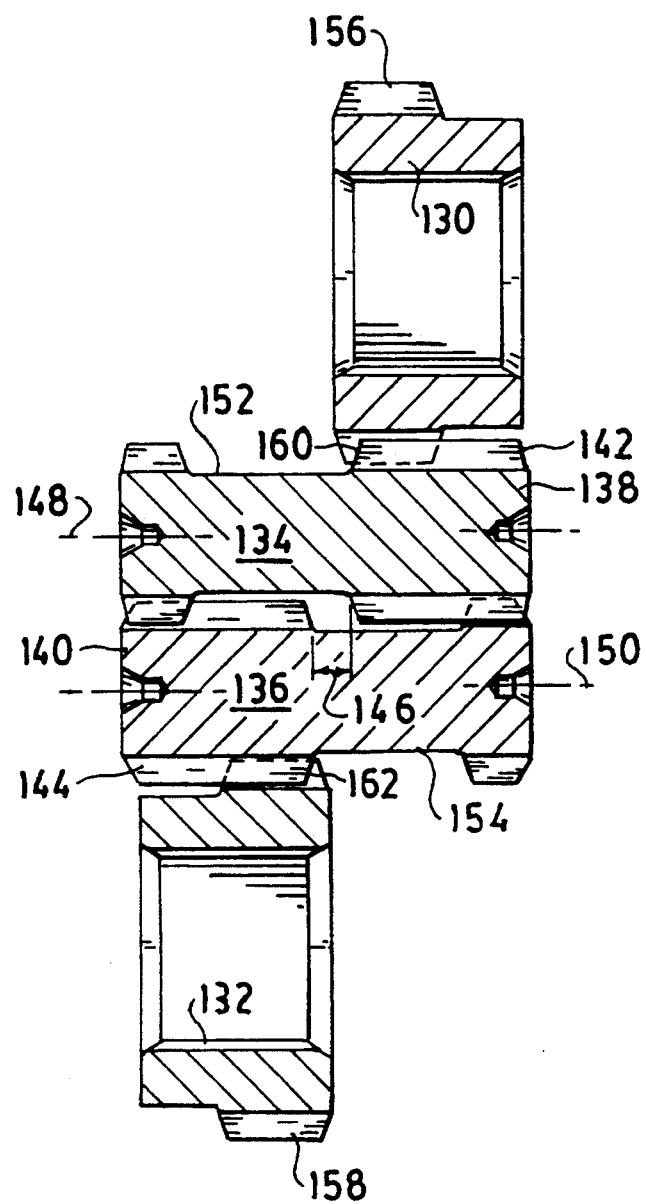
FIG. 6 is a diagram similar to FIG. 3 showing an alternative gear arrangement for use in a similar parallel-axis gear differential.

An alternative arrangement of gearing is shown in FIG. 6 in which a pair of top and bottom side gears 130 and 132 are interconnected by a pair of top and bottom planet gears 134 and 136. In contrast to the gear train of FIG. 3, main gear sections 138 and 140 of the top and bottom planet gears have respective teeth 142 and 144 that are separated through a clearance space 146. The teeth 142 and 144 are shortened in the direction of top and bottom planet gear axes 148 and 150 by extending respective stem sections 152 and 154.

Within the clearance space 146, teeth 156 and 158 of the top and bottom side gears 130 and 132 overlap the teeth 142 and 144 of their mating planet gears. Similar to the preceding embodiment, the amount of overlap is sufficient to prevent edge contact between the mating teeth under normal operating conditions. However, inner ends 160 and 162 of the planet gear teeth 142 and 144 are also inclined to a chamfer angle throughout a distance spanning their respective top and bottom lands to further reduce the possibility of chipping edges of the teeth.

We claim:

1. A parallel-axis gear differential comprising:
   a housing rotatable about a common axis of rotation of a pair of drive shafts;
   top and bottom side gears positioned within said housing for receiving ends of the respective drive shafts for rotation therewith about said common axis;
   at least one pair of top and bottom planet gears positioned within said housing in engagement with said side gears for rotation about respective axes that extend parallel to said common axis of rotation;
   each of said top and bottom planet gears having a main gear section and a transfer gear section interconnected by a stem section;
   said main gear section of said top planet gear being in mesh with both said top side gear and said transfer gear section of said bottom planet gear;
   said main gear section of said bottom planet gear being in mesh with both said bottom side gear and said transfer gear section of said top planet gear;
   one of (a) said top and bottom side gears and (b) said main gear sections of the top and bottom planet gears having respective teeth separated by a clearance space in a direction along said common axis; and
   the other of (a) said top and bottom side gears and (b) said main gear sections of the top and bottom planet gears having respective teeth that overlap said teeth of said one of (a) the top and bottom side gears and (b) the main gear sections of the top and bottom planet gears within said clearance space.

2. The differential of claim 1 further comprising:
   each of said gear sections of the planet gears and said side gears being further defined by a respective axial plane containing one of said planet gear axes and said common axis and by a respective transverse plane that extends normal to said one axis;
   each of said gear sections of the planet gears and said side gears having teeth that are bound in said respective axial planes by inner and outer tooth ends and are bound in said respective transverse planes by top and bottom lands; and
   said outer tooth ends of the teeth in each gear section of the planet gears being formed in respective end faces of each of said planet gears.

3. The differential of claim 2 in which said outer tooth ends of the teeth in the gear sections of the first planet gear are inclined with respect to said respective transverse planes through an angle different from said outer tooth ends of the teeth in the gear sections of the second planet gear.

4. The differential of claim 2 in which said inner tooth ends of the teeth in the transfer gear sections of each planet gear are inclined with respect to said respective transverse planes throughout a distance that extends between said top and bottom lands of the teeth in the transfer gear sections.

5. The differential of claim 4 in which said outer tooth ends of the teeth in each side gear are inclined with respect to said respective transverse planes throughout a distance that extends between said top and bottom lands of the side gear teeth.

6. The differential of claim 5 in which said teeth of the top and bottom side gears are separated by said clearance space, and said teeth of the main gear sections of the top and bottom planet gears overlap said teeth of the top and bottom side gears within said clearance space.

7. The differential of claim 6 in which said inner tooth ends of the teeth in each side gear are inclined with respect to said respective transverse planes throughout a distance that extends between said top and bottom lands of the side gear teeth.

8. The differential of claim 5 in which said teeth of the main gear sections of the top and bottom planet gears are separated by said clearance space, and said teeth of the top and bottom side gears overlap said teeth of the main gear sections of the top and bottom planet gears within said clearance space.

9. The differential of claim 8 in which said inner tooth ends of the teeth in the main gear sections of each planet gear are inclined with respect to said respective transverse planes throughout a distance that extends between said top and bottom lands of the teeth in the main gear sections.

* * * * *